United States Patent Office 3,389,157
Patented June 18, 1968

3,389,157
GROUP IV-A ORGANOMETALLIC COMPLEXES OF PREDOMINANTLY TETRANUCLEAR AROMATIC CATALYTIC CYCLE OIL STOCK EXTRACTS
Hugh E. Ramsden, Scotch Plains, N.J., assignor to Esso Research and Engineering Company, a corporation of Delaware
No Drawing. Continuation-in-part of application Ser. No. 207,427, July 3, 1962. This application Oct. 4, 1965, Ser. No. 492,913
5 Claims. (Cl. 260—429)

ABSTRACT OF THE DISCLOSURE

Novel compositions comprising Group IV-A organometallic complexes of predominantly tetranuclear aromatic catalytic cycle oil stock extracts, the compounds being useful as fungicides and as agricultural chemicals generally.

---

This application is a continuation-in-part of Ser. No. 207,427 filed by Hugh E. Ramsden on July 3, 1962, and now abandoned.

This invention is directed to the preparation of novel compositions of matter comprising Group IV-A (Sn, Si, Pb, Ge) organo metallic complexes of predominantly tetranuclear aromatic catalytic cycle oil stock extracts, and a process for preparing said organo metallic complexes.

More specifically the present invention is directed to novel organo metallic compositions of matter prepared by reacting a metal halide salt (and preferably a hydrocarbyl metal halide salt) of a Group IV-A metal with an alkali metal adduct of a predominantly tetranuclear aromatic catalytic cycle oil stock extract.

The metal halide (or hydrocarbyl metal halide) salt is a compound of the formula:

$$R_nMX_{4-n}$$

where $n$ is an integer of 0 to 3; R is monovalent or divalent organic hydrocarbyl group selected from the group consisting of alkyl, alkenyl (including vinylic compounds), aryl, alkaryl, aralkyl, and alicyclic organic groups containing from 1 to 20 carbon atoms; M is a Group IV-A metal; and X is a halogen (chlorine, bromine, fluorine, or iodine). Of course, when one or more of the R groups is aryl, said group(s) will contain at least six carbon atoms; when aralkyl or alkaryl, at least seven carbon atoms; when alicyclic at least three carbon atoms, etc. As used herein the term metal halide salt includes those containing one or more hydrocarbyl groups.

These new organo metallic compositions of matter can have molecular weights ranging from about 318 to about 6000, and more usually ranging from about 320 to 1500; and are prepared according to this invention by reacting the above mentioned hydrocarbyl metal halides with the alkali metal adducts of predominantly tetranuclear aromatic catalytic cycle oil stock extracts at temperatures ranging from about 0 to 100° C. and usually at temperatures from about 20 to 80° C. and more preferably from temperatures of about 20 to 70° C., with satisfactory results being secured at the refluxing temperatures of the reaction mixtures. Reaction pressures can range from below atmospheric pressure to well above atmospheric pressure. Thus, for example, pressures ranging from about 0.1 to 500 atmospheres can be used. Usually atmospheric pressure is employed, however.

The reaction can be conducted in the presence of an inert solvent, for example, hydrocarbon solvents, ethers and other similar inert solvents. Suitable examplary inert reaction solvents include, but are not limited to the following: benzene, hexene, xylene, tetrahydrofuran, diethyl carbitol, dimethyl ether of diethylene glycol, dimethyl Cellosolve, dibutyl Cellosolve, dibutyl ether of triethylene glycol, dioxane (1,4 isomer), methyltetrahydrofuran, tetrahydropyran; etc.

Usually it is desirable to conduct the above reaction in inert atmospheres, and for this purpose inert blankets of nitrogen, argon, helium, etc., can be provided.

The hydrocarbyl Group IV-A metal halide or reactant usually is a chloride or bromide with chlorides being preferred because of the greater availability of such reactants and also usually the greater economy of their use (i.e. losing a lower atom wt. halogen). Suitable exemplary Group IV-A metal halides and hydrocarbyl metal halides which can be used in accordance with this invention include, but are not limited to, the following: $SnCl_4$, $SnBr_4$, $SnI_4$, $SnF_4$, $PbCl_4$, $PbBr_4$, $PbI_4$, $GeCl_4$, $GeBr_4$, $GeI_4$, $SiCl_4$, $SiBr_4$, dibutyl tin dichloride, dimethyl silicon dichloride (dimethyl dichloro silane), tributyltin chloride, diphenyltin dichloride, diethyllead bromide, trimethyllead bromide, ethylgermanium trichloride, vinyldibutyl chloride, divinylphenyltin chloride, divinyltin dichloride, vinyl methylsilicon dichloride, pentamethylenetin dichloride, diisoprenebis (dibutylin chloride), dihydroanthracenedibutyltin dichloride. When hydrocarbyl Group IV-A metal halides are employed, the R group(s) are usually alkyl or aryl groups containing from 1 to about 12 carbon atoms. According to the present invention, it is preferable to employ hydrocarbyl Group IV-A metal halides containing alkyl groups having from 1 to 12 carbon atoms.

The predominantly tetranuclear aromatic hydrocarbon catalytic cycle oil stock extracts (the alkali metal adducts of which are reacted with the hydrocarbyl Group IV-A metal halides) employed in accordance with this invention are complex mixtures of individual compounds with as many as 200 or even more individual compounds being present in some cases. These catalytic cycle oil stock aromatic extracts can be characterized as having a boiling range within the range of 260 to 590° C., having 50% boiling points (ASTM) above 400° C., and as containing more than 75 wt. percent of aromatic hydrocarbons, a major portion (greater than 50% by weight) of which are tetranuclear aromatic hydrocarbons having four condensed rings, but containing no more than about 1 wt. percent of dinuclear (2 ring) aromatic hydrocarbons.

These predominantly tetranuclear aromatic catalytic cycle oil stock extracts characteristically contain 80+ wt. percent of aromatics of which at least a major portion are tetranuclear aromatics. These materials characteristically have the following properties and compositional analyses:

| Characteristic Properties | Ranges | |
|---|---|---|
|  | Usual | Preferred |
| Gravity, ° API | 0.2 to 0.8 | 0.25 to 0.75 |
| Viscosity, SSU, 100° F | 900 to 2,000 | 950 to 1,950 |
| Viscosity, SSU, 210° F | 45 to 65 | 50 to 62 |
| Conradson Carbon, Wt. percent | 1 to 5 | 1.5 to 4 |
| Aniline Point, ° F | 50 to 90 | 55 to 85 |
| Iodine No | 45 to 55 | 48 to 53 |
| Distillation, ASTM, 10 mm. Hg, Corrected to 760 mm., ° F.: | | |
| 5% | 700 to 760 | 710 to 750 |
| 50% | 765 to 830 | 770 to 825 |
| Final | 890 to 1,050 | 900 to 1,020 |

| Characteristic Composition Components: | Range, Usual Wt. Percent |
|---|---|
| Saturates (unreactive paraffins and naphthenes) | 8 to 20 |
| Paraffins | 0.1 to 2.5 |
| Naphthenes | 9 to 18 |
| Aromatics (reactive) | 80 to 90 |
| 2 Ring (acenaphthenes) | 0.1 to 1.5 |
| 3 Ring (3-ring acenaphthylenes and phenanthrenes) | 12 to 20 |
| 4 Ring (pyrenes and chrysenes) | 60 to 75 |
| Thiophenes (benzothiophenes, dibenzothiophenes and thiophenophenanthrenes) | 4 to 9 |
| Average Molecular Weight | 250 to 300 |
| (Preferred Molecular Weight) | (260 to 280) |

The suitable predominantly tetranuclear aromatic catalytic cycle oil extract is reacted to form the corresponding alkali metal adduct thereof by contacting, usually with intimate mixing, the said aromatic concentrate (catalytic cycle oil stock extract) with an alkali metal at a temperature between about 20 and 120° C. Preferably said contact is conducted at temperatures of about 65 to 110° C. for about two to eight hours while refluxing the reaction mixture in an inert solvent. Suitable inert solvents for the formation of the alkali metal adducts include $C_4$ to $C_{12}$ saturated aliphatic cyclic ethers and lower dialkyl ethers of alkylene and polyalkylene glycols, e.g., tetrahydrofuran.

Any alkali metal can be employed to form the aromatic concentrate-alkali metal adducts, e.g., lithium, sodium, potassium, rubidium, cesium, etc. Lithium, sodium, and potassium are usually employed, and of these alkali metals, sodium is the most preferred due to its ready availability and lower cost.

The preparation of the alkali metal adducts of the predominantly tetranuclear aromatic catalytic cycle oil stock concentrates is disclosed in greater detail in a copending application of the present inventor, Ser. No. 207,427, and the disclosure of S.N. 207,427 is incorporated herein by reference. This application discloses and claims the preparation of the alkali metal adducts to which reference is had above, which adducts are reacted with the Group IV-A hydrocarbyl metal halides to produce the organo metallic complexes of the present invention. The preparation of the alkali metal adducts is set forth in greater detail in S.N. 207,427.

As noted hereinabove, the Group IV-A organo metallic complexes of the present invention are readily prepared by reacting the alkali metal adducts of the aromatic concentrate with a Group IV-A hydrocarbyl metal halide at temperatures of about 0 to 100° C. and pressures of about 0.1 to 500 atmospheres. The products obtained have molecular weights of about 218 to 6000 and are water-insoluble heavy, oily liquids (when prepared in organic solution). The product residues (liquid or solid) are then obtained by solvent evaporation, e.g., using a rotary film evaporator under vacuum.

The Group IV-A metal containing organo metallic complexes of predominantly tetranuclear aromatic hydrocarbons prepared in accordance with this invention can be used as soil fungicides (to protect seedlings and seeds), as stabilizers for polyvinyl chloride plastics and resins, as paint preservers (to destroy fungi and bacteria) especially for marine paints, and other related uses.

The present invention will be illustrated in greater detail in the following examples, which are included herein to illustrate rather than limit the present invention.

EXAMPLE 1

| Properties: | Catalytic cycle extract |
|---|---|
| Gravity, ° API | 0.3 |
| Viscosity, SSU, 100° F. | 980 |
| Viscosity, SSU, 210° F. | 51.9 |
| Conradson carbon, wt. percent | 1.61 |
| Aniline point, ° F. | 57 |
| Iodine No. | 49.5 |
| Distillation, ASTM, 10 mm. Hg, corrected to 760 mm., ° F.: | |
| 5% | 716 |
| 50% | 778 |
| Final | 912 |

| Components: | Concentration, wt. percent |
|---|---|
| Saturates (unreactive paraffins and naphthenes) | 12.4 |
| Aromatics (reactive) | 87.6 |
| Acenaphthenes | 1.0 |
| 3-ring acenaphthylenes | 2.7 |
| Phenanthrenes | 14.4 |
| Pyrenes | 53.5 |
| Chrysenes | 9.8 |
| Benzothiophenes | 0.2 |
| Dibenzothiophenes | 3.3 |
| Thiophenophenanthrenes | 2.7 |
| Average molecular weight | 265 |

The disodium adducts of the above catalytic cycle predominantly tetranuclear aromatic extract was prepared by reacting ½ mole of said above extract with 1 gram atom of metallic sodium (chips) in 400 ml. of tetrahydrofuran solvent at initial temperatures of about 26 to 36° C. The reaction was started at about 26° C. and rose over the three hours' sodium addition time to 36° C. After the sodium addition was completed, the reaction mixture was heated to reflux (about 68° C.) and stirred at reflux temperature for an additional 3.75 hours. Nearly all of the sodium metal had reacted, indicating that the disodium adduct of the reacting polynuclear hydrocarbons in the feed had formed.

To the above disodium adducts of the above indicated aromatic catalytic cycle extract there was added 0.5 mol of dibutyl tin dichloride. The mixture was heated at reflux, then cooled, and methanol and water added. The organic oil was separated and the solvent evaporated to obtain an organometallic oil having chemically bonded tin (14.5 wt. percent tin) and a low chlorine content. This organometallic derivative had a molecular weight of 445.

This liquid organo metallic material can be employed directly (or formulated as desired) as a fungicide, general biocide, insecticide, nematocide, and as an oil lube additive for improving antiwear properties.

EXAMPLE 2

The procedure of Example 1 was repeated only dimethyl dichloro silane (dimethyl silicon dichloride) was employed as the Group IV-A hydrocarbyl metal halide in place of dibutyl tin dichloride. The corresponding product was a silicon-containing, chlorine-containing, organo metallic complex. This complex contained 2.53 wt. percent Si. The molecular weight of the silicon organo metallic derivative was approximately 396. This organo metallic complex can be used as a lubricity additive for silicone oils and as a fungistat.

EXAMPLE 3

Example 1 is repeated using trimethyl lead chloride in place of the dibutyltin dichloride resulting in the bis trimethyl lead organometallic complex of the catalytic cycle stock aromatics. This material is a fungicide and insecticide.

EXAMPLE 4

Example 1 is repeated using tributyltin bromide resulting in a bis tributyltin organometallic complex of the catalytic cycle stock aromatics. This material is a general biocide possessing fungicidal, insecticidal, acaricidal, bacteriocidal, and herbicidal properties.

EXAMPLE 5

Example 1 is repeated using diethylgermanium dichloride resulting in the corresponding germanium organometallic complex.

EXAMPLE 6

Example 1 is repeated using (cyclo) pentamethylene tin dichloride, $(CH_2)_5SnCl_2$, resulting in the corresponding tin organometallic complex useful as a biocide.

EXAMPLE 7

Example 1 is repeated using diphenyltin dichloride resulting in the corresponding tin organometallic complex useful as a fungicide.

What is claimed is:

1. Group IV-A organic metallic complexes of predominantly tetranuclear aromatic concentrates of catalytic cycle oil extracts boiling within the range of about 260 to 590° C. and having 50% boiling points (ASTM) above 400° C. and containing more than 75 wt. percent aromatic hydrocarbons, a major portion of which are tetranuclear aromatic hydrocarbons.

2. Group IV-A organometallic complexes as in claim 1 where said metal is tin.

3. Group IV-A organometallic complexes as in claim 1 wherein said metal is silicon.

4. Group IV-A organometallic complexes as in claim 1 wherein said metal is lead.

5. Group IV-A organometallic complexes as in claim 1 wherein said metal is germanium.

References Cited

UNITED STATES PATENTS 3,122,527   2/1964   Webb et al. _____ 260—94.9

TOBIAS E. LEVOW, *Primary Examiner.*

ARTHUR P. DEMERS, *Assistant Examiner.*